US012652333B2

(12) United States Patent (10) Patent No.: US 12,652,333 B2
Funaki (45) Date of Patent: Jun. 9, 2026

(54) INFORMATION PROCESSING APPARATUS, METHOD, AND NON-TRANSITORY COMPUTER READABLE MEDIUM

(71) Applicant: FUJIFILM Business Innovation Corp., Tokyo (JP)

(72) Inventor: Shota Funaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/177,240

(22) Filed: Mar. 2, 2023

(65) Prior Publication Data

US 2024/0064200 A1 Feb. 22, 2024

(30) Foreign Application Priority Data

Aug. 16, 2022 (JP) ................................. 2022-129582

(51) Int. Cl.
H04L 67/1095 (2022.01)
H04L 67/1097 (2022.01)

(52) U.S. Cl.
CPC ...... H04L 67/1095 (2013.01); H04L 67/1097 (2013.01)

(58) Field of Classification Search
None
See application file for complete search history.

(56) References Cited

U.S. PATENT DOCUMENTS

| | | | | |
|---|---|---|---|---|
| 10,439,831 | B1 * | 10/2019 | Governale | ............ H04M 15/00 |
| 11,494,340 | B2 * | 11/2022 | Kilaru | .................... G06F 3/0643 |
| 2016/0043926 | A1 * | 2/2016 | Frei | ...................... H04L 12/2803 |
| | | | | 709/224 |
| 2017/0235647 | A1 * | 8/2017 | Kilaru | ................. H04L 67/1095 |
| | | | | 707/652 |
| 2018/0018345 | A1 * | 1/2018 | Jain | ..................... G06F 3/04817 |

FOREIGN PATENT DOCUMENTS

JP 4930603 B2 5/2012

OTHER PUBLICATIONS

Karypidis et al., "OmniStore: a system for ubiquitous personal storage management", Jan. 5, 2009, IEEE, Fourth Annual IEEE International Conference on Pervasive Computing and Communications (PERCOM'06) (2006, pp. 11 pp.-147) (Year: 2009).*

* cited by examiner

*Primary Examiner* — Davoud A Zand
(74) *Attorney, Agent, or Firm* — Oliff PLC

(57) ABSTRACT

An information processing apparatus includes a processor and a storage section. The processor is configured to: store, in the storage section, data to be synchronized with data in a different information processing apparatus; and keep the data stored in the storage section available for use as long as the information processing apparatus is connected to at least one of plural connection destinations set in advance.

15 Claims, 13 Drawing Sheets

Figure 2:
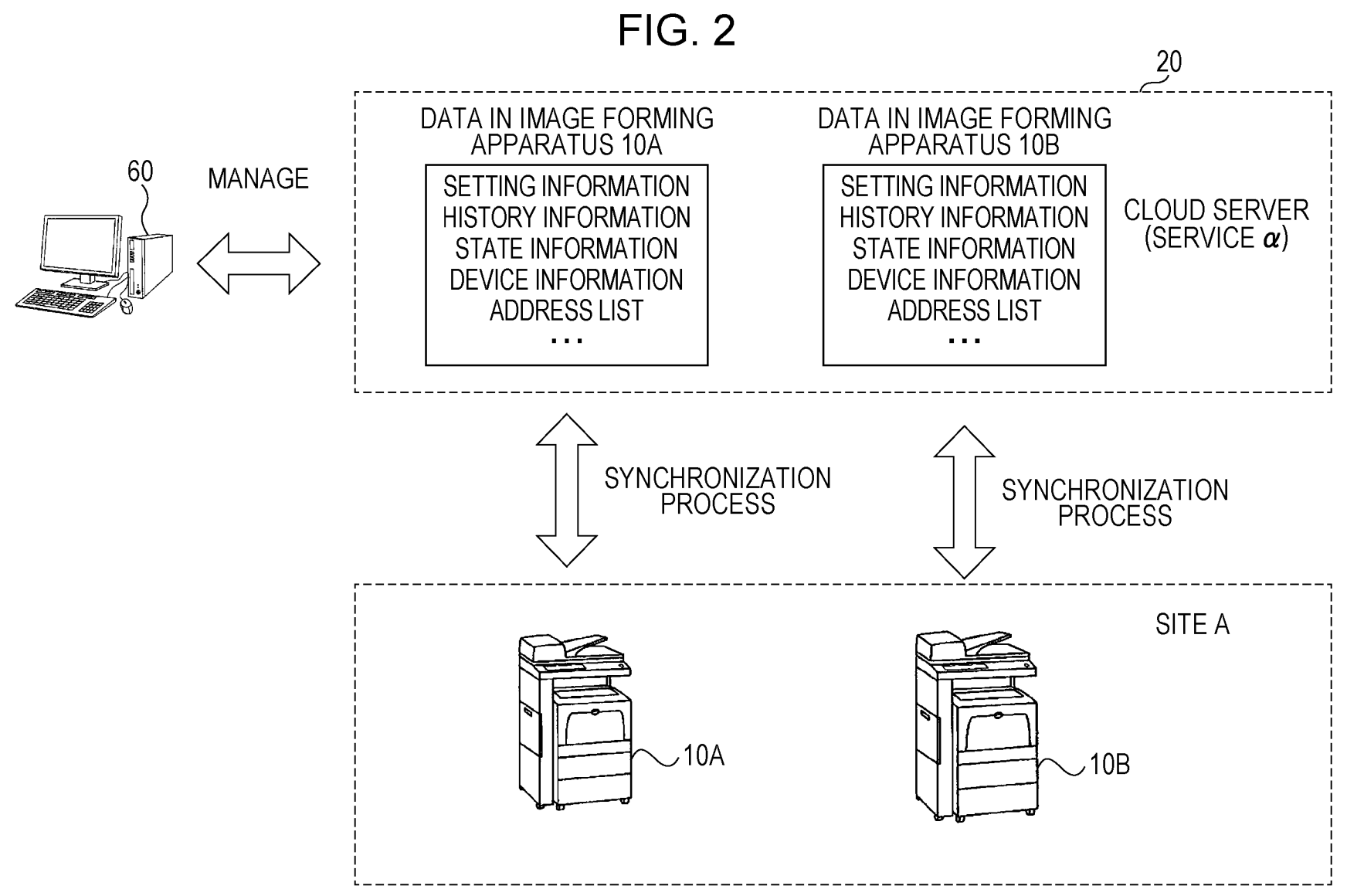

CLOUD SERVER (SERVICE α)

DATA IN IMAGE FORMING APPARATUS 10B

SETTING INFORMATION
HISTORY INFORMATION
STATE INFORMATION
DEVICE INFORMATION
ADDRESS LIST
...

DATA IN IMAGE FORMING APPARATUS 10A

SETTING INFORMATION
HISTORY INFORMATION
STATE INFORMATION
DEVICE INFORMATION
ADDRESS LIST
...

SYNCHRONIZATION PROCESS

SYNCHRONIZATION PROCESS

SITE A

10B

10A

MANAGE

Figure 4:
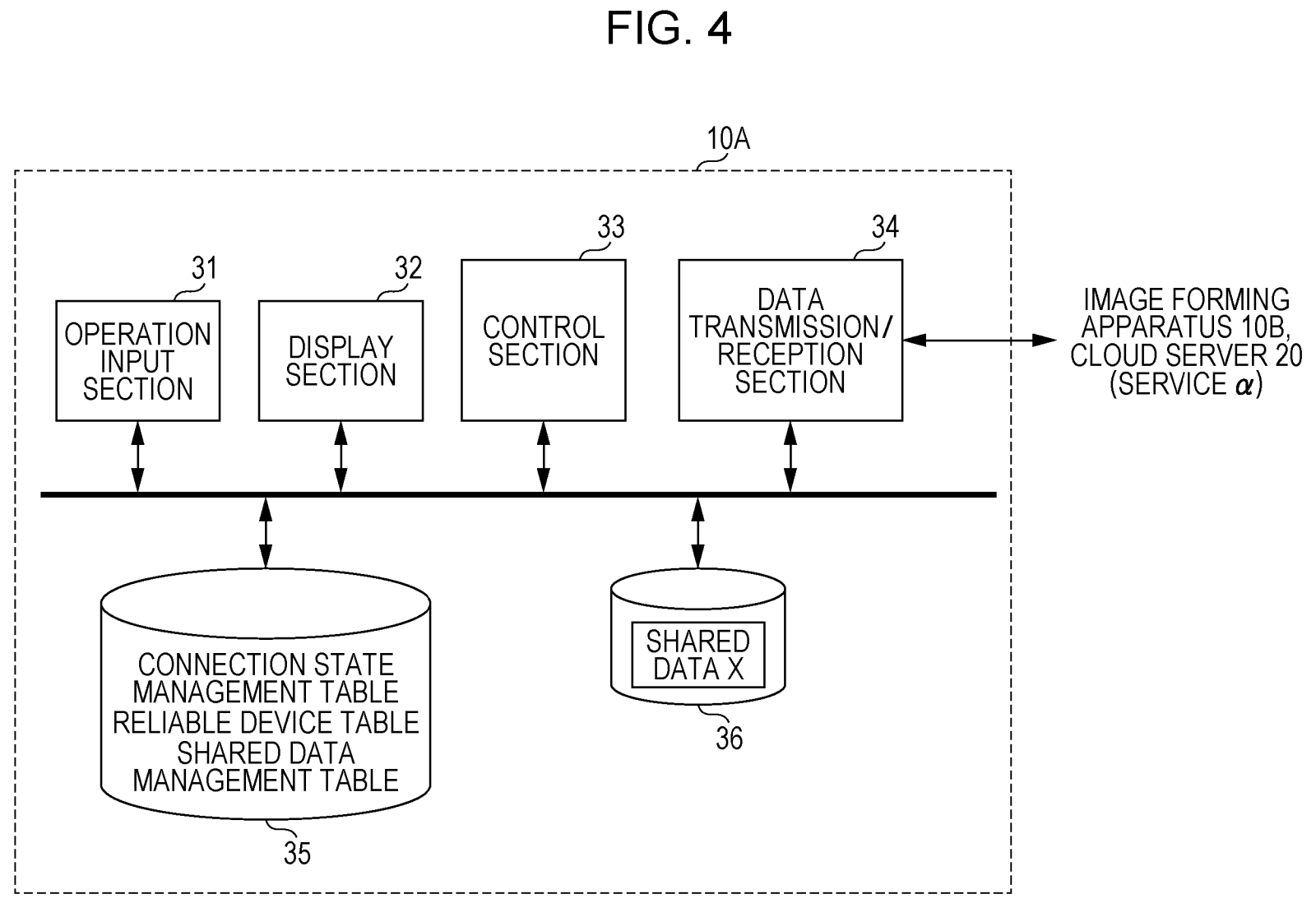

IMAGE FORMING APPARATUS 10B, CLOUD SERVER 20 (SERVICE α)

10A

31 OPERATION INPUT SECTION

32 DISPLAY SECTION

33 CONTROL SECTION

34 DATA TRANSMISSION/ RECEPTION SECTION

36 SHARED DATA X

35 CONNECTION STATE MANAGEMENT TABLE
RELIABLE DEVICE TABLE
SHARED DATA MANAGEMENT TABLE

FIG. 5

| DEVICE BEING CONNECTED |
|---|
| SERVICE α |
| IMAGE FORMING APPARATUS 20B |
| ..... |

FIG. 6

| GROUP 1 | GROUP 2 | ..... |
|---|---|---|
| SERVICE α | SERVICE β | ..... |
| IMAGE FORMING APPARATUS 10A | IMAGE FORMING APPARATUS 10C | ..... |
| IMAGE FORMING APPARATUS 10B | IMAGE FORMING APPARATUS 10D | ..... |
| ..... | ..... | ..... |

FIG. 7

| NAME OF SHARED DATA | FIRST PROVIDER | RELIABLE GROUP |
|---|---|---|
| SHARED DATA X | SERVICE α | GROUP 1 |
| SHARED DATA Y | SERVICE β | GROUP 2 |
| ..... | ..... | ..... |

1

INFORMATION PROCESSING APPARATUS, METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2022-129582 filed Aug. 16, 2022.

BACKGROUND

(i) Technical Field

The present disclosure relates to an information processing apparatus, a method, and a non-transitory computer readable medium.

(ii) Related Art

Japanese Patent No. 4930603 discloses an information processing apparatus that acquires data stored in a virtual space and stores the data in a storage section of the apparatus itself, and that deletes, when it is determined that communication with a different information processing apparatus is blocked, the data stored in the storage section at that time, in order to save the storage capacity of the apparatus itself and enhance the security of the data acquired from the virtual space.

SUMMARY

In an information processing apparatus that stores and uses data synchronized with data in a different information processing apparatus, synchronized data are deleted in the case where the data for synchronization in the different information processing apparatus are deleted. In the case where the information processing apparatus is disconnected from the different information processing apparatus before data synchronized with deleted data are deleted, however, data that should be deleted survive, which leaves the possibility of occurrence of an information leakage. In order to prevent such an information leakage of data, it is conceivable to render the data for synchronization unavailable for use when the connection to the different information processing apparatus is not identified. However, the convenience of the data may be degraded if the data for synchronization are rendered unavailable for use simply when the information processing apparatus is not connected to the different information processing apparatus, such as when a certain communication failure is caused.

Aspects of non-limiting embodiments of the present disclosure relate to providing an information processing apparatus, a method, and a non-transitory computer readable medium that keep data for synchronization available for use, even in the case where a connection to a different information processing apparatus as a partner of a synchronization process is lost, while preventing an information leakage of data to be synchronized with data in the different information processing apparatus.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor and a storage section, in which the processor is configured to: store, in the storage section, data to be synchronized with data in a different information processing apparatus; and keep the data stored in the storage section available for use as long as the information processing apparatus is connected to at least one of a plurality of connection destinations set in advance.

BRIEF DESCRIPTION OF THE DRAWINGS

An exemplary embodiment of the present disclosure will be described in detail based on the following figures, wherein:

FIG. 2 illustrates how a cloud server and information processing apparatuses store various data while performing a synchronization process;

FIG. 3 is a block diagram illustrating the hardware configuration of the image forming apparatus according to the exemplary embodiment of the present disclosure;

FIG. 4 is a block diagram illustrating the functional configuration of the image forming apparatus according to the exemplary embodiment of the present disclosure;

FIG. 5 illustrates an example of a connection state management table stored in a table storage section;

FIG. 6 illustrates an example of a reliable device table stored in the table storage section;

FIG. 7 illustrates an example of a shared data management table stored in the table storage section;

DETAILED DESCRIPTION

Now, an exemplary embodiment of the present disclosure will be described in detail with reference to the drawings.

Figure 1:
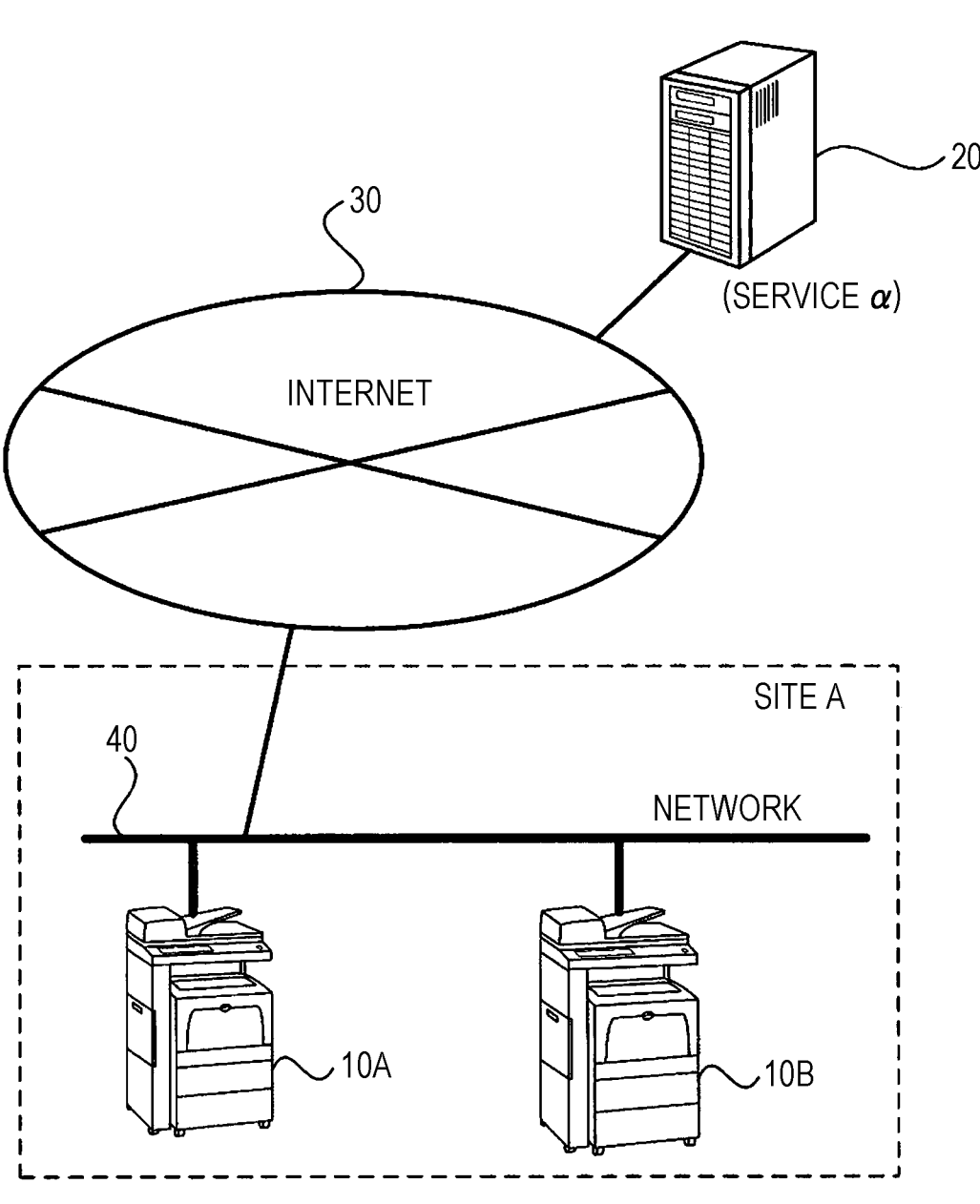
FIG. 1 illustrates the system configuration of an information processing system according to an exemplary embodiment of the present disclosure.

FIG. 1 illustrates the system configuration of an information processing system according to an exemplary embodiment of the present disclosure.

In the information processing system according to the exemplary embodiment of the present disclosure, as illustrated in FIG. 1, two image forming apparatuses 10A, 10B installed in a site A and a cloud server 20 are connected to each other via an Internet 30. The image forming apparatuses 10A, 10B are connected to each other through a network 40 in the site A. The image forming apparatuses 10A, 10B are so-called multi-function devices that have a plurality of functions such as a print function, a scan function, a copy function, and a facsimile function.

As illustrated in FIG. 2, the cloud server 20 provides a service, called digital shadowing, of holding various data such as setting information, history information, state information, device information, and address lists stored in physical devices connected through the Internet 30 in synchronization with the physical devices. The service provided by the cloud server 20 is referred to as a service α.

Specifically, the cloud server 20 stores various data such as setting information, history information, state information, device information, and address lists of the image forming apparatuses 10A, 10B while performing a synchronization process with the image forming apparatuses 10A, 10B.

This service allows a terminal apparatus that manages a certain device to check the state of the device, manage a change in setting of the device, etc. even in the case where the terminal apparatus is not directly connectable to the device to be managed. A case where an external terminal apparatus 60 attempts to make a change to the setting information on the image forming apparatus 10A, for example, will be described. First, the external terminal apparatus 60 makes a change to the setting information on the image forming apparatus 10A in the cloud server 20. Then, the image forming apparatus 10A changes the setting information on the apparatus itself by acquiring updated setting information when a synchronization process with the cloud server 20 is executed.

That is, use of this service allows the external terminal apparatus 60 to check the state of the image forming apparatuses 10A, 10B, update setting information on the image forming apparatuses 10A, 10B, etc., even in the case where the terminal apparatus 60 is not connectable to the image forming apparatuses 10A, 10B installed in the site A.

This service facilitates management of shared data that are shared by a plurality of devices such as an address list, for example. For example, an address list is stored in a shared space in the cloud server 20, and the image forming apparatuses 10A, 10B synchronize address lists in the apparatuses themselves with the address list stored in the shared space in the cloud server 20 when a synchronization process is performed with the cloud server 20. In this manner, the address lists in the image forming apparatuses 10A, 10B are also updated by simply updating the address list stored in the shared space in the cloud server 20 from the terminal apparatus 60.

It is necessary to manage confidential information such as an address list so as not to cause an information leakage. To that end, in the case where the image forming apparatus 10A is to be discarded, for example, the address list in the image forming apparatus 10A is deleted by deleting the address list in the cloud server 20 from the terminal apparatus 60.

However, a problem is caused in the case where the image forming apparatus 10A becomes unconnectable to the cloud server 20 before data such as the address list in the image forming apparatus 20A, which are synchronized with data such as the address list deleted from the cloud server 20, are deleted. Specifically, data that should be deleted such as the address list survive, which leaves the possibility of occurrence of an information leakage. For example, customer information such as an address list may remain in an image forming apparatus that is used in a personal residence if an employee that uses the image forming apparatus which stores the customer information disconnects an Internet line before the employee leaves his/her job. Meanwhile, customer information may be leaked if an image forming apparatus is relocated without deleting the customer information.

In order to prevent such an information leakage of data, it is conceivable to render data for synchronization such as an address list unavailable for use when the connection between the image forming apparatus 10A and the cloud server 20 is not identified. However, the convenience of the data may be degraded if the data for synchronization are rendered unavailable for use simply when the information processing apparatus is not connected to the cloud server 20, such as when a certain communication failure is caused. Specifically, it would be inconvenient for a user if an address list becomes unavailable for use and it becomes impossible to transmit a facsimile etc. simply when a failure occurs in the network 40 in the site A.

Thus, the information processing system according to the present exemplary embodiment performs control to be described below, in order to keep data for synchronization available for use, even in the case where the information processing system is not connected to a different information processing apparatus as a partner of a synchronization process, while preventing an information leakage of data to be synchronized with data in the different information processing apparatus.

Figure 3:
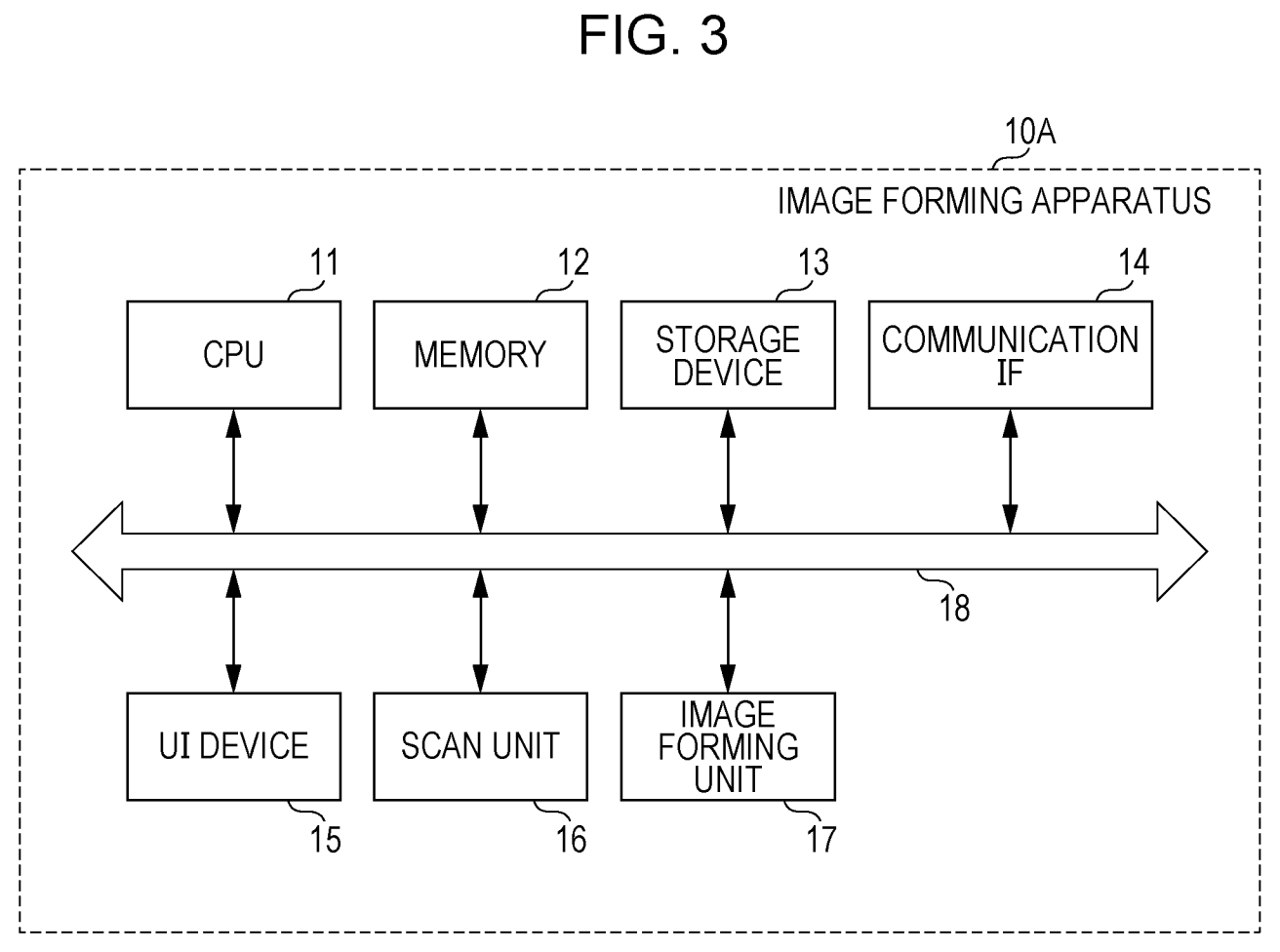

Next, the hardware configuration of the image forming apparatus 10A in the information processing system according to the present exemplary embodiment is illustrated in FIG. 3. While the configuration of the image forming apparatus 10A is principally described below, the image forming apparatus 10B etc. also have a similar configuration.

As illustrated in FIG. 3, the image forming apparatus 10A includes a central processing unit (CPU) 11, a memory 12, a storage device 13 such as a hard disk drive, a communication interface (abbreviated as "IF") 14 that transmits and receives data to and from an external device etc. via a network, a user interface (abbreviated as "IF") device 15 that includes a touch screen or a liquid crystal display and a keyboard, a scan unit 16, and an image forming unit 17. These constituent elements are connected to each other via a control bus 18.

The CPU 11 is a processor that controls operation of the image forming apparatus 10A by executing a predetermined process on the basis of a control program stored in the memory 12 or the storage device 13. While the CPU 11 is describes as reading and executing the control program stored in the memory 12 or the storage device 13 in the present exemplary embodiment, this is not limiting. The control program may be provided in the form of being stored in a computer-readable storage medium. For example, the program may be provided in the form of being stored in an optical disc such as a Compact Disc (CD)-read only memory (ROM) and a Digital Versatile Disc (DVD)-ROM, or in the form of being stored in a semiconductor memory such as a Universal Serial Bus (USB) memory and a memory card. The control program may be acquired from an external device via a communication line connected to the communication interface 14.

FIG. 4 is a block diagram illustrating the functional configuration of the image forming apparatus 10A implemented by executing the control program described above.

As illustrated in FIG. 4, the image forming apparatus 10A according to the present exemplary embodiment includes an operation input section 31, a display section 32, a control section 33, a data transmission/reception section 34, a table storage section 35, and a data storage section 36. Functional blocks related to an image forming process etc. are not illustrated in the block diagram in FIG. 4.

The data transmission/reception section 34 transmits and receives data to and from external devices such as the image forming apparatus 10B and the cloud server 20. The operation input section 31 receives an input of information on various operations performed by a user. The display section 32 is controlled by the control section 33 so as to display various information for the user.

The data storage section 36 stores various data such as an address list to be synchronized with data in the cloud server 20. In the following description, shared data X are used as an example of the data to be synchronized with data in the cloud server 20.

The control section 33 stores the shared data X acquired from the cloud server 20 via the data transmission/reception section 34 in the data storage section 36, and performs a process of synchronizing the shared data X in the data storage section 36 with shared data X stored in the cloud server 20 by regularly communicating with the cloud server 20, for example. That is, the control section 33 stores, in the data storage section 36, the shared data X to be synchronized with the shared data X in the cloud server 20 as a different information processing apparatus.

The table storage section 35 stores a connection state management table, a reliable device table, and a shared data management table.

An example of the connection state management table stored in the table storage section 35 is illustrated in FIG. 5. An example of the reliable device table is illustrated in FIG. 6. An example of the shared data management table is illustrated in FIG. 7.

The connection state management table is a table that indicates a list of devices being presently connected. In the example illustrated in FIG. 5, the service α, that is, the cloud server 20, and the image forming apparatus 10B are registered as the devices being connected.

The reliable device table is a table in which a plurality of reliable devices are registered as connection destinations set in advance. The reliable devices are devices that allow determining that a certain device is placed in a reliable environment. That is, it is determined that a certain device is in a reliable environment if the device is able to communicate with a reliable device.

In the example of the reliable device table illustrated in FIG. 6, a plurality of devices are registered in groups. In the example of the shared data management table illustrated in FIG. 7, a first provider and a reliable group are correlated with each piece of shared data. Therefore, in the case where a user performs an operation to reference the shared data X, the control section 33 references a shared data management table such as that illustrated in FIG. 7 to check that the reliable group registered for the shared data X is a group 1. Then, the control section 33 references the reliable device table illustrated in FIG. 6 to understand that the image forming apparatus 10B and the service a (cloud server 20) are included in the group 1 besides the image forming apparatus 10A. Therefore, regarding the shared data X, the image forming apparatus 10B and the service a (cloud server 20) are set as reliable devices for the image forming apparatus 10A.

The control section 33 keeps the shared data X stored in the data storage section 36 available for use as long as the image forming apparatus 10A is connected to at least one of a plurality of connection destinations set in advance as reliable devices. Specifically, the control section 33 keeps the shared data X stored in the data storage section 36 available for use as long as the image forming apparatus 10A is connected to one of the two connection destinations, namely the image forming apparatus 10B and the service a (cloud server 20).

The control section 33 determines whether or not the image forming apparatus 10A is presently connected to which of the devices with reference to the connection state data illustrated in FIG. 5.

The control section 33 renders the shared data X unavailable for use in the case where the image forming apparatus 10A is not connectable to any of the plurality of connection destinations set in advance as reliable devices.

For example, the control section 33 renders the shared data X unavailable for use by deleting the shared data X stored in the data storage section 36. Alternatively, the control section 33 renders the shared data X stored in the data storage section 36 unavailable for use by rendering the shared data X unavailable for reference, e.g. locked.

For the shared data X, as described above, one of the plurality of connection destinations set in advance as reliable devices is the cloud server 20 which performs a synchronization process with the shared data X stored in the data storage section 36. Also for the shared data X, one of the plurality of connection destinations set in advance as reliable devices is the image forming apparatus 10B which is connected in the same network 40.

One of the plurality of connection destinations set in advance other than the cloud server 20 which performs a synchronization process for the shared data X stored in the data storage section 36 may be a different device that is present in the same physical environment such as on the same floor, in the same room, or in the same building, for example.

Further, a first provider is registered for each piece of shared data in the shared data management table illustrated in FIG. 7. For example, the service a, that is, the cloud server 20, is registered as the first provider of the shared data X. In the case where the image forming apparatus 10A itself is registered as the first provider for certain shared data, the control section 33 permits the image forming apparatus 10A to reference the shared data, irrespective of the present state of connection to the connection destinations registered as reliable devices, when an operation to reference the shared data is performed on the image forming apparatus 10A.

In the above description, the image forming apparatus 10A is permitted to reference the shared data X when connected to at least one of the plurality of connection destinations registered in advance. In the case where a larger number of connection destinations are registered in advance as reliable devices, however, the image forming apparatus 10A may be permitted to reference the shared data X when connected to at least two connection destinations, or connected to at least a preset number of connection destinations such as at least three connection destinations.

The control section 33 executes a synchronization process for data when the state of connection to external devices has been changed. Specifically, when the number of devices registered in the connection state management table illustrated in FIG. 5 is changed, the control section 33 checks the state of connection to the plurality of connection destinations set in advance as reliable devices, and holds the shared data if it is confirmed that the image forming apparatus 10A is connected to at least one of the connection destinations. Then, the control section 33 checks the state of connection to the plurality of connection destinations set in advance as reliable devices, and deletes the shared data, or renders the shared data unavailable for reference, in the case where the image forming apparatus 10A is not connected to any of the connection destinations.

In the case where the new connection destination is the cloud server 20, the control section 33 executes a synchronization process between the shared data stored in the cloud server 20 and the shared data stored in the data storage section 36.

Next, operation of the image forming apparatus 10A according to the present exemplary embodiment will be described in detail with reference to the drawings.

Figure 8:
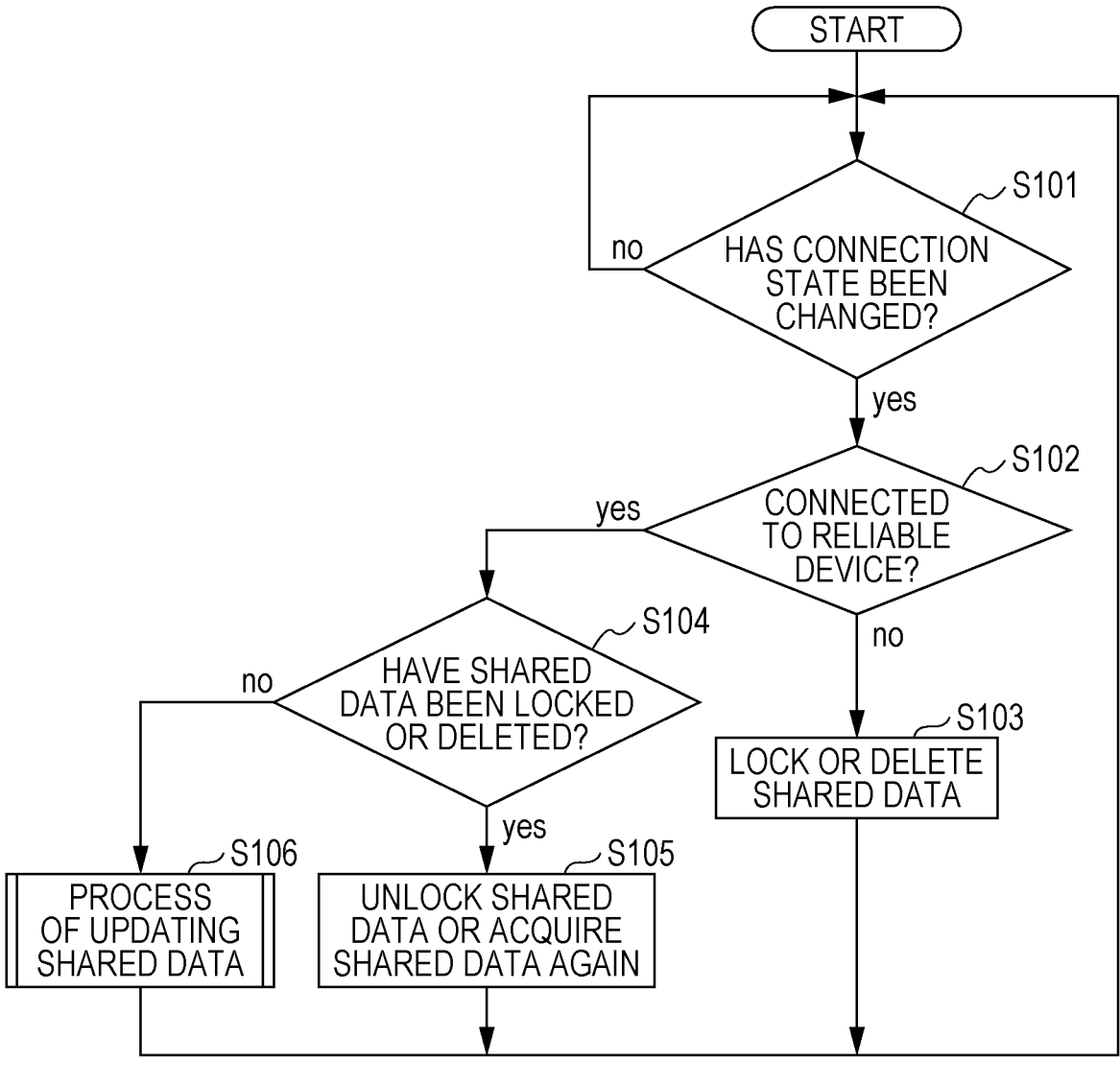
FIG. 8 is a flowchart illustrating operation of the image forming apparatus according to the exemplary embodiment of the present disclosure.
Figure 9:
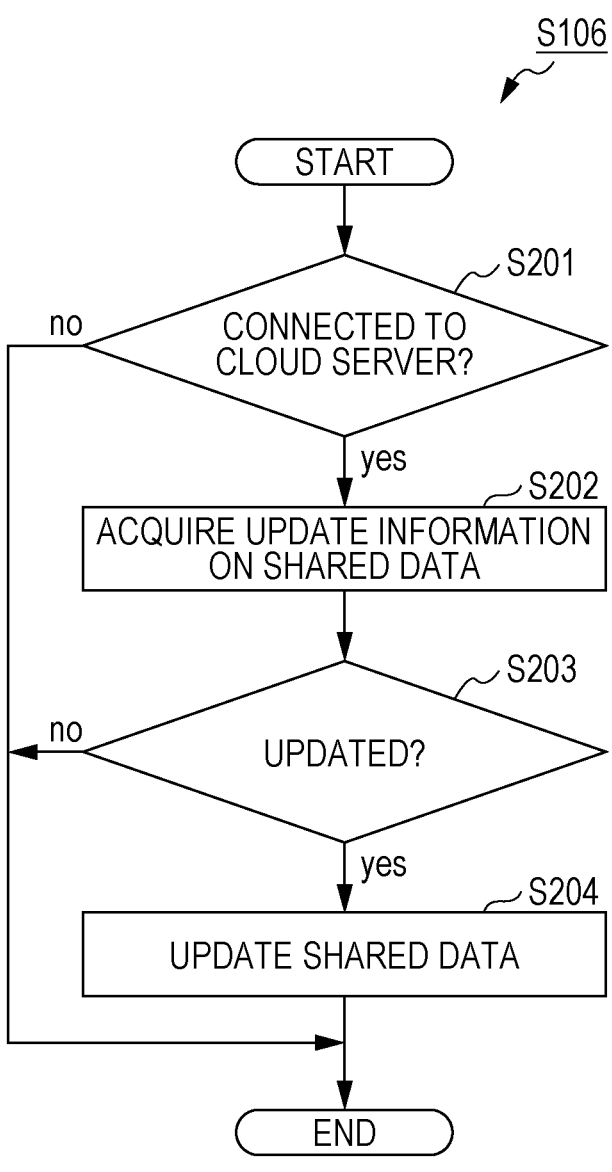
FIG. 9 is a flowchart illustrating the details of a process in step S106 illustrated in the flowchart in FIG. 8.

First, operation of the image forming apparatus 10A will be described with reference to the flowcharts in FIGS. 8 and 9.

The control section 33 checks the state of connection to external devices via the data transmission/reception section 34, and updates the connection state management table illustrated in FIG. 5. In step S101, the control section 33 references the connection state management table to determine whether or not the connection state has been changed. In the case where it is determined in step S101 that the connection state has been changed, the control section 33 checks the state of connection to the plurality of connection destinations set as reliable devices in step S102.

Even in the case where the connection state has not been changed, the control section 33 executes a synchronization process for the shared data stored in the data storage section 36 with the shared data in the cloud server 20 regularly at intervals set in advance.

In the case where it is confirmed in step S102 that the image forming apparatus 10A is not connected to any of the plurality of connection destinations set as reliable devices, the control section 33 locks or deletes the shared data in step S103.

In the case where it is confirmed in step S102 that the image forming apparatus 10A is connected to any of the plurality of connection destinations set as reliable devices, the control section 33 determines whether or not the shared data have been locked or deleted in step S104.

In the case where it is determined in step S104 that the shared data have been locked or deleted, the control section 33 unlocks the shared data or acquires the shared data again from the cloud server 20 in step S105.

In the case where it is determined in step S104 that the shared data have not been locked or deleted, the control section 33 executes a process of updating the shared data in step S106.

Next, the details of the process in step S106 illustrated in the flowchart in FIG. 8 will be described with reference to the flowchart in FIG. 9.

First, in step S201, the control section 33 determines whether or not the image forming apparatus 10A is connected to the cloud server 20.

In the case where it is determined in step S201 that the image forming apparatus 10A is connected to the cloud server 20, the control section 33 acquires update information on the shared data from the cloud server 20 in step S202.

Then, in step S203, the control section 33 determines whether or not the shared data stored in the data storage section 36 have been updated on the basis of the acquired update information.

In the case where it is determined in step S203 that the shared data have been updated, the control section 33 updates the shared data stored in the data storage section 36 by executing a synchronization process for the updated shared data with the shared data in the cloud server 20 in step S204.

The control section 33 ends the process in the case where it is determined in step S201 that the image forming apparatus 10A is not connected to the cloud server 20 and in the case where it is determined in step S203 that the shared data have not been updated.

Next, operation of the information processing system according to the present exemplary embodiment will be specifically described with reference to FIGS. 10 to 15.

Figure 10:
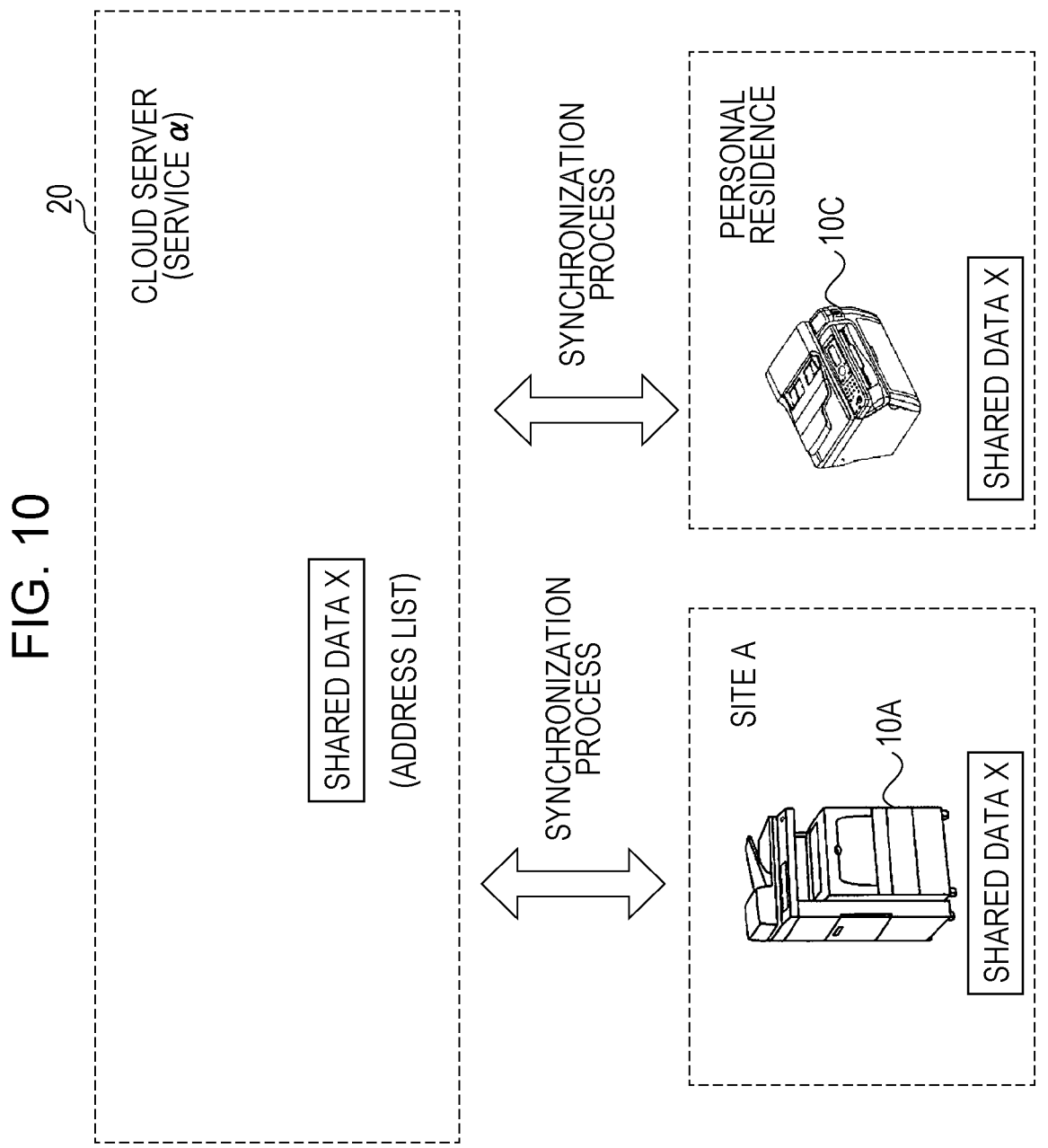
FIG. 10 illustrates a state in which only an image forming apparatus is installed in each of a site and a personal residence.

First, a state in which only an image forming apparatus 10A and an image forming apparatus 10C are installed in a site A and a personal residence, respectively, is illustrated in FIG. 10. In FIG. 10, shared data X such as an address list are stored in each of the image forming apparatus 10A and the image forming apparatus 10C, and synchronized with shared data X in the cloud server 20.

Figure 11:
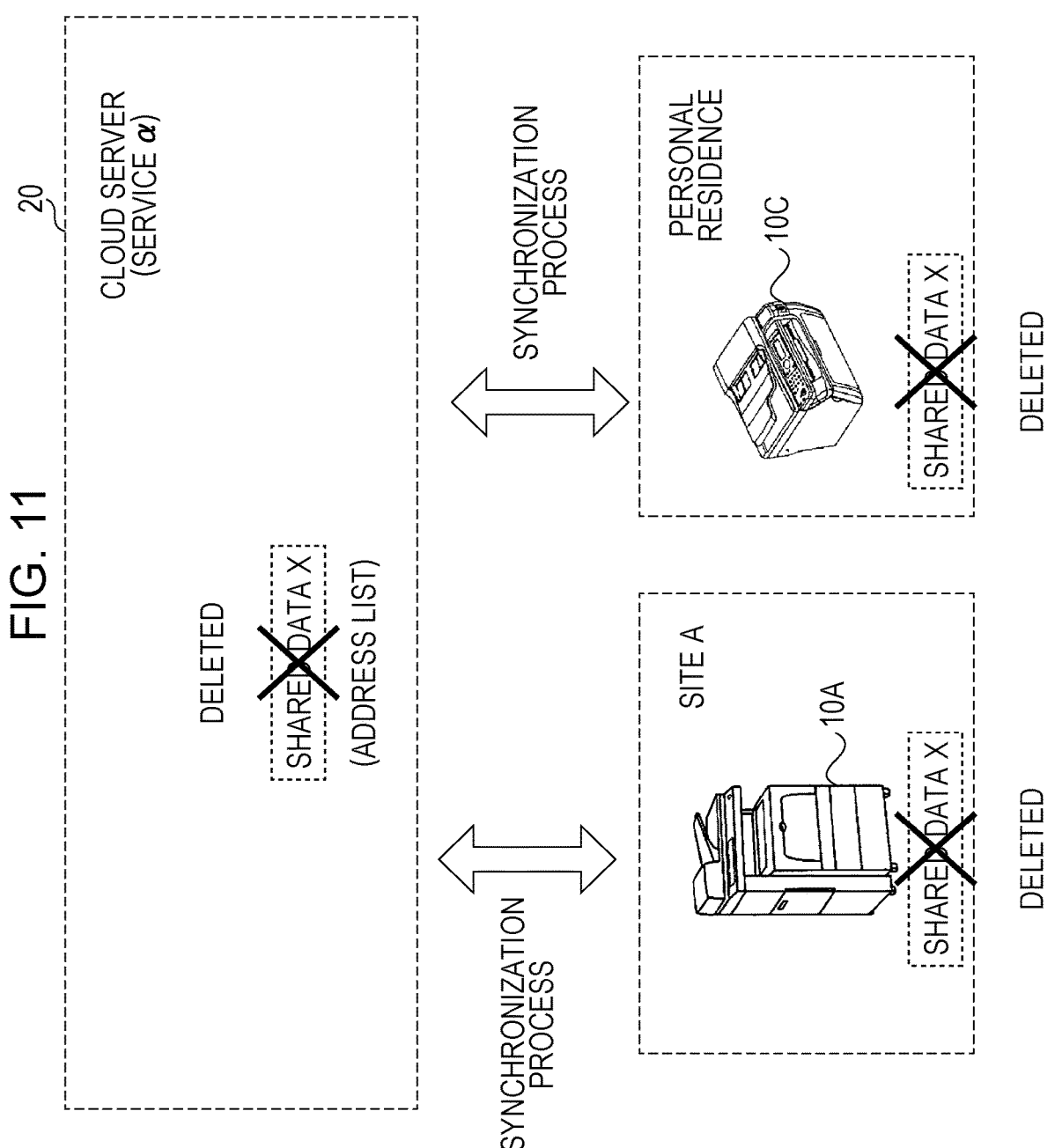
FIG. 11 illustrates a state in which shared data in a cloud server have been deleted in the state illustrated in FIG. 10.

A case where the shared data X in the cloud server 20 have been deleted as illustrated in FIG. 11 is described. In this case, the image forming apparatuses 10A, 10C are connected to the cloud server 20, and regularly execute a synchronization process with the cloud server 20, and thus the shared data X in the image forming apparatuses 10A, 10C are also deleted when the synchronization process is performed.

Figure 12:
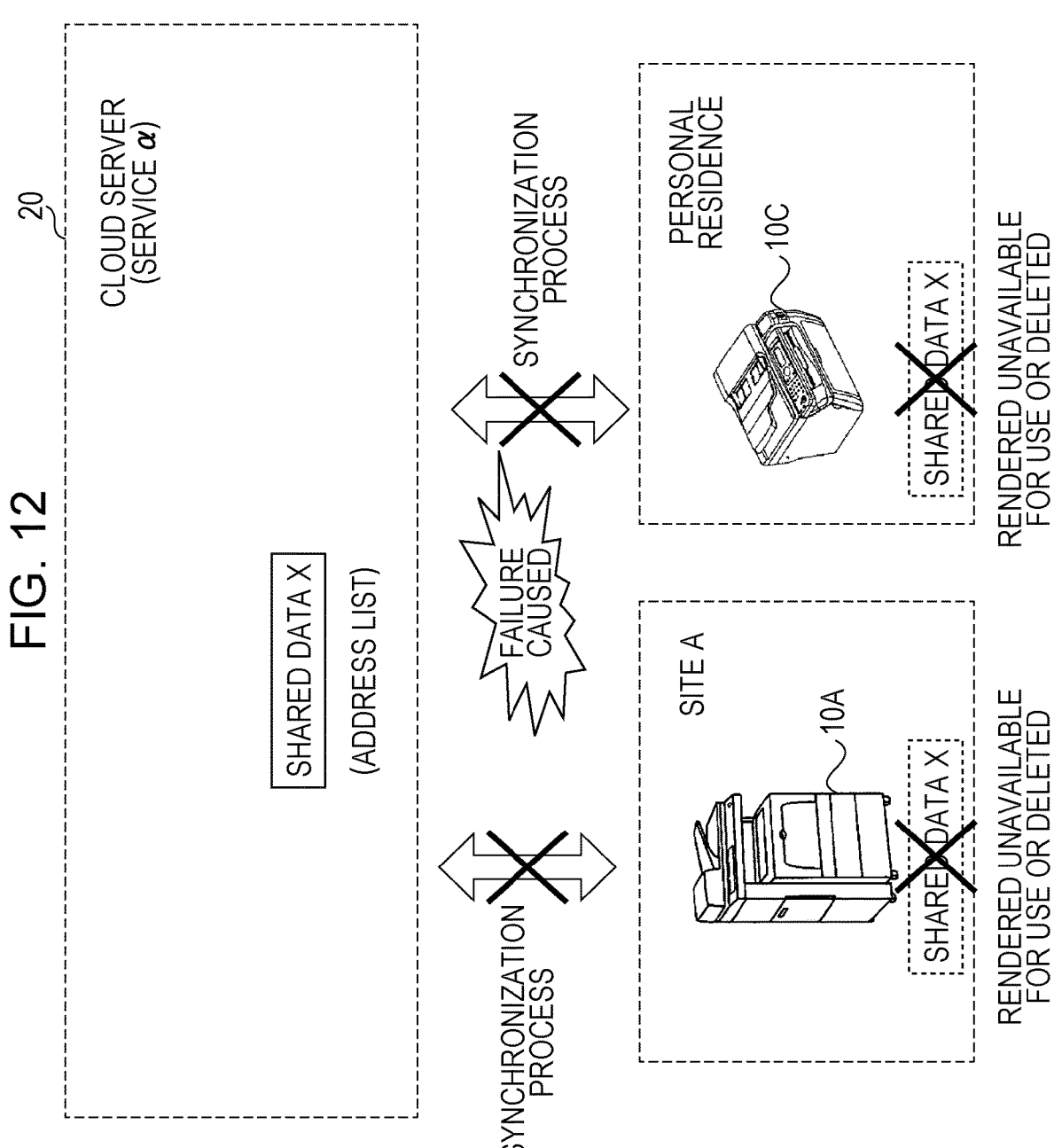
FIG. 12 illustrates a state in which connections between the image forming apparatuses and the cloud server are blocked in the state illustrated in FIG. 10.

A case where connections between the image forming apparatuses 10A, 10C and the cloud server 20 are blocked is described with reference to FIG. 12. In this case, the connection of the image forming apparatuses 10A, 10C to any of the connection destinations registered as reliable devices is not identified, and therefore the stored shared data X are rendered unavailable for use or deleted. However, this configuration may be inconvenient for a user, since the address list is rendered unavailable for use or deleted in the case where an unintended communication failure is caused between the image forming apparatuses 10A, 10C and the cloud server 20 as illustrated in FIG. 12.

Figure 13:
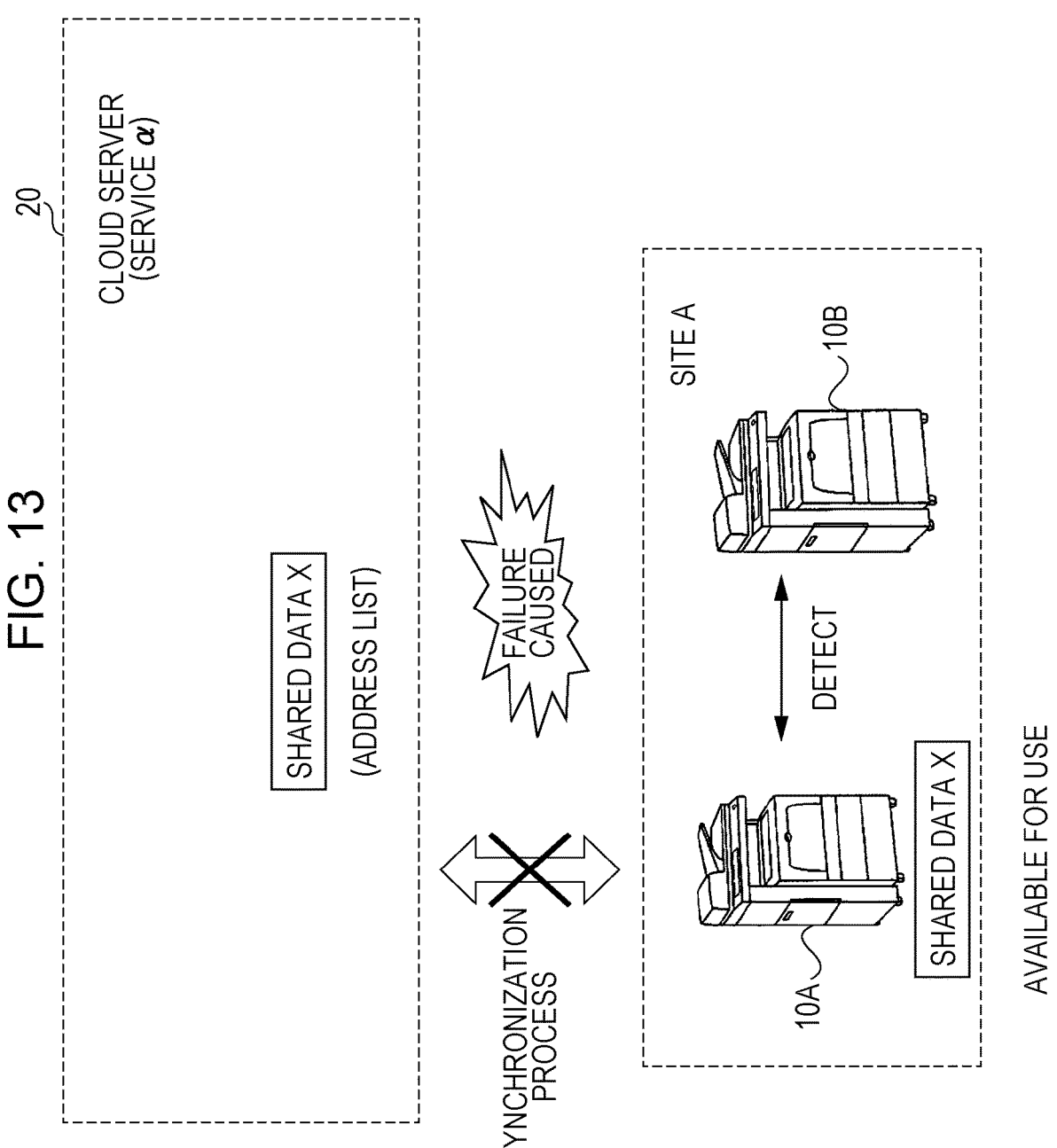
FIG. 13 illustrates a state in which image forming apparatuses are installed in a site.

Thus, the image forming apparatus 10A according to the present exemplary embodiment is enabled to use the shared data X, even in the case where the connection to the cloud server 20 is blocked, if a connection to the image forming apparatus 10B is identified as illustrated in FIG. 13, for example. That is, it is considered that the image forming apparatus 10A is in a reliable environment, namely the site A, when the image forming apparatus 10A is connected to the image forming apparatus 10B, and there is a low possibility of an information leakage even if the shared data X are rendered available for use.

Figure 14:
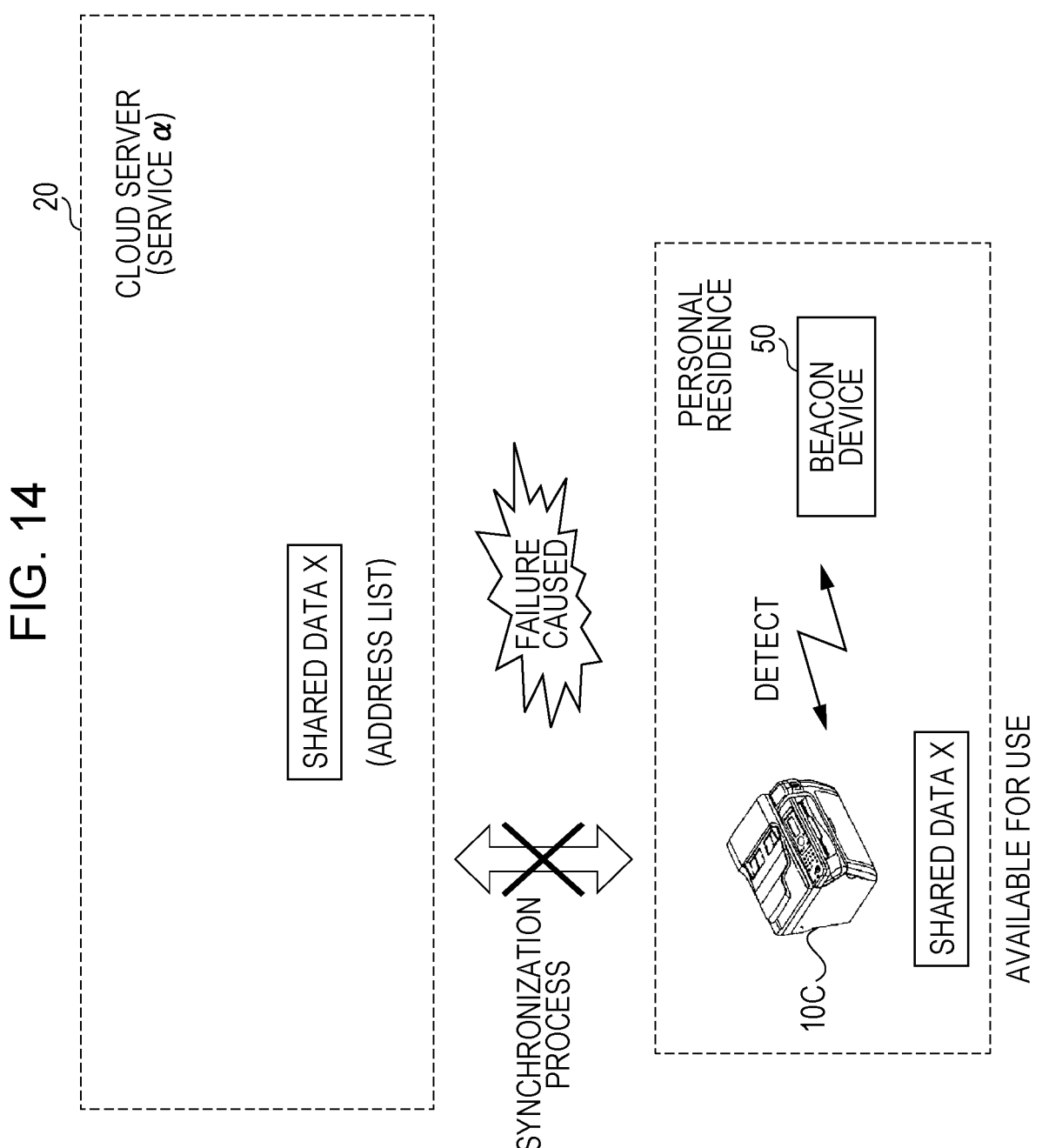
FIG. 14 illustrates a state in which an image forming apparatus and a beacon device are installed in a personal residence.

It is considered to be difficult to install a reliable device in a personal residence in the case where an employee teleworks in his/her personal residence. There is also a case where a device used by a user as an employee is privately owned by the user. Therefore, a beacon device 50 is separately supplied to be installed in a personal residence in the case where shared data such as an address list are used in a situation in which a user uses a privately owned image forming apparatus 10C in his/her personal residence as illustrated in FIG. 14. The beacon device 50 is connected to the image forming apparatus 10C through wireless communication such as Wi-Fi (registered trademark), for example. The beacon device 50 is registered as a reliable device in the image forming apparatus 10C.

With such a configuration, the shared data X are rendered available for use in the case where a connection between the image forming apparatus 50C, which is installed in the personal residence, and the beacon device 50 is identified, even in the case where the connection between the image forming apparatus 10C and the cloud server 20 is blocked.

The beacon device 50 is an example of a different device that is present in the same physical environment, and the image forming apparatus 10A determines the physical environment in which the beacon device 50 is present as a reliable environment.

Figure 15:
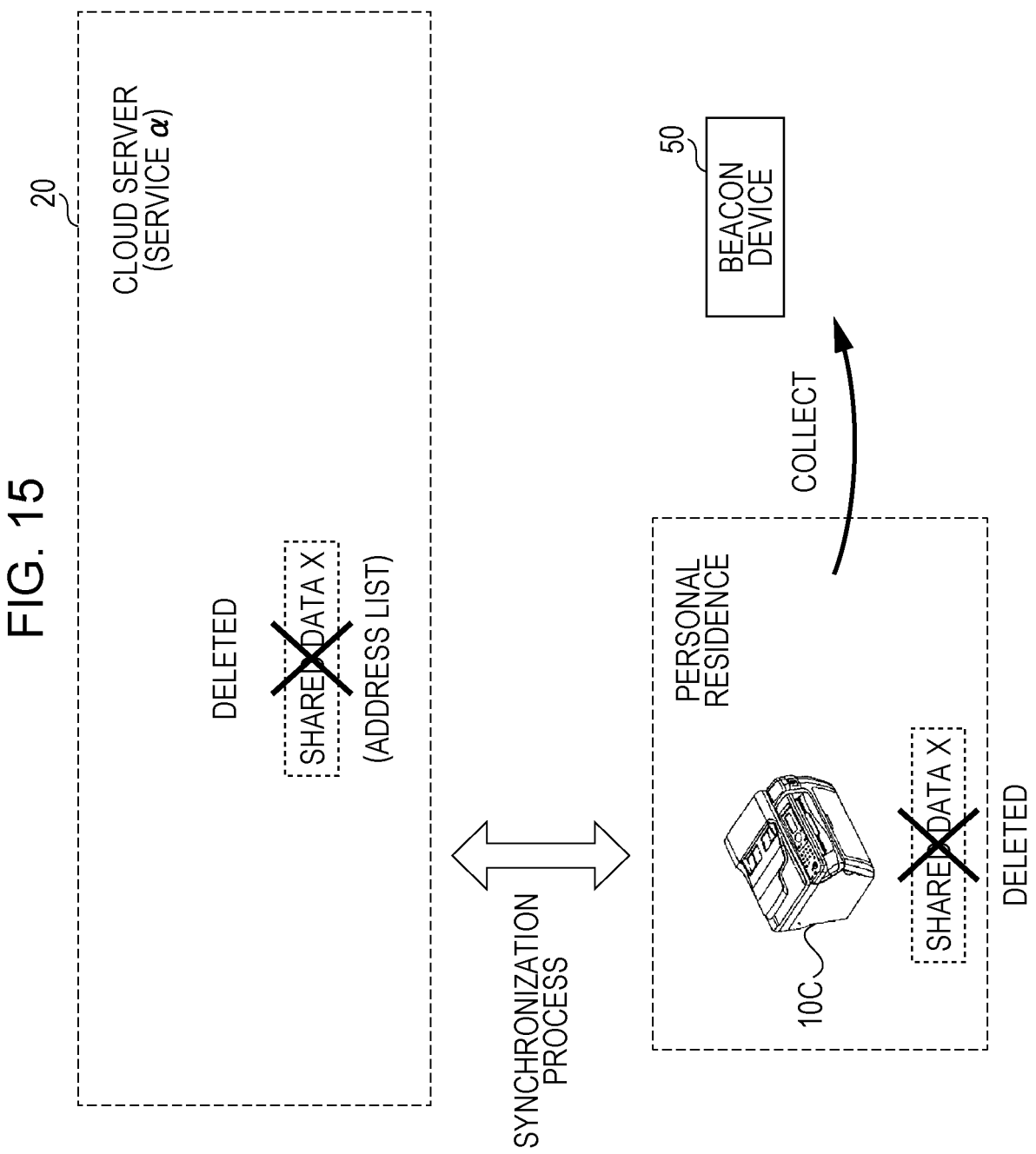
FIG. 15 illustrates a state in which the beacon device is collected from the personal residence and shared data in the cloud server are deleted in the state illustrated in FIG. 14.

In the case where this employee leaves his/her job, the shared data X in the cloud server 20 are deleted, and the beacon device 50 is collected from the personal residence, as illustrated in FIG. 15. Then, when the image forming apparatus 10C is connected to the cloud server 20, the image forming apparatus 10C deletes the shared data X in the apparatus itself in synchronization with the shared data X in the cloud server 20 which have been deleted.

Even in the case where a user in the personal residence does not connect the image forming apparatus 10C to the cloud server 20 with evil intent, the image forming apparatus 10C also deletes the shared data X stored in the apparatus itself, since the beacon device 50 has been collected and no connection to a reliable device is identified.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Modifications

While the present disclosure is applied to image forming apparatuses in the exemplary embodiment described above, the present disclosure is not limited thereto, and the present disclosure is similarly applicable to various information processing apparatuses such as personal computers, tablet terminal devices, and portable terminal devices.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
   a processor; and
   a storage section,
   wherein the processor is configured to:

store, in the storage section, data to be synchronized with data in a different information processing apparatus;
   set, in advance, a plurality of connection destinations for the information processing apparatus, the plurality of connection destinations being reliable devices with which the information processing apparatus can communicate;
   determine whether the information processing apparatus is connected to at least one of the plurality of connection destinations set in advance;
   keep the data stored in the storage section available for use as long as the information processing apparatus is connected to the at least one of a plurality of connection destinations set in advance; and
   render the data unavailable for use in a case where the information processing apparatus is not connected to any of the plurality of connection destinations set in advance.

2. The information processing apparatus according to claim 1,
   wherein the processor is configured to render the data stored in the storage section unavailable for use by deleting the data.

3. The information processing apparatus according to claim 1,
   wherein the processor is configured to render the data stored in the storage section unavailable for use by rendering the data unavailable for reference.

4. The information processing apparatus according to claim 1,
   wherein one of the plurality of connection destinations set in advance is a different information processing apparatus that performs a synchronization process for the data stored in the storage section.

5. The information processing apparatus according to claim 2,
   wherein one of the plurality of connection destinations set in advance is a different information processing apparatus that performs a synchronization process for the data stored in the storage section.

6. The information processing apparatus according to claim 3,
   wherein one of the plurality of connection destinations set in advance is a different information processing apparatus that performs a synchronization process for the data stored in the storage section.

7. The information processing apparatus according to claim 4,
   wherein one of the plurality of connection destinations set in advance other than the different information processing apparatus that performs a synchronization process for the data stored in the storage section is a different information processing apparatus connected in a same network.

8. The information processing apparatus according to claim 5,
   wherein one of the plurality of connection destinations set in advance other than the different information processing apparatus that performs a synchronization process for the data stored in the storage section is a different information processing apparatus connected in a same network.

9. The information processing apparatus according to claim 6,
   wherein one of the plurality of connection destinations set in advance other than the different information processing apparatus that performs a synchronization process for the data stored in the storage section is a different information processing apparatus connected in a same network.

10. The information processing apparatus according to claim 4, wherein one of the plurality of connection destinations set in advance other than the different information processing apparatus that performs a synchronization process for the data stored in the storage section is a different device that is present in a same physical environment.

11. The information processing apparatus according to claim 5, wherein one of the plurality of connection destinations set in advance other than the different information processing apparatus that performs a synchronization process for the data stored in the storage section is a different device that is present in a same physical environment.

12. The information processing apparatus according to claim 6, wherein one of the plurality of connection destinations set in advance other than the different information processing apparatus that performs a synchronization process for the data stored in the storage section is a different device that is present in a same physical environment.

13. The information processing apparatus according to claim 1, wherein the reliable devices include a beacon separately communicating with the image forming apparatus.

14. A method comprising:

storing, in a storage section of an information processing apparatus, data to be synchronized with data in a different information processing apparatus;

setting, in advance, a plurality of connection destinations for the information processing apparatus, the plurality of connection destinations being reliable devices with which the information processing apparatus can communicate;

determining whether the information processing apparatus is connected to at least one of the plurality of connection destinations set in advance;

keeping the data stored in the storage section available for use as long as the information processing apparatus is connected to at least one of a plurality of connection destinations set in advance; and rendering the data unavailable for use in a case where the information processing apparatus is not connected to any of the plurality of connection destinations set in advance.

15. A non-transitory computer readable medium storing a program causing a computer to execute a process comprising:

storing, in a storage section of an information processing apparatus, data to be synchronized with data in a different information processing apparatus;

setting, in advance, a plurality of connection destinations for the information processing apparatus, the plurality of connection destinations being reliable devices with which the information processing apparatus can communicate;

determining whether the information processing apparatus is connected to at least one of the plurality of connection destinations set in advance;

keeping the data stored in the storage section available for use as long as the information processing apparatus is connected to at least one of a plurality of connection destinations set in advance; and rendering the data unavailable for use in a case where the information processing apparatus is not connected to any of the plurality of connection destinations set in advance.

* * * * *